US011984641B2

(12) United States Patent
Lai

(10) Patent No.: US 11,984,641 B2
(45) Date of Patent: May 14, 2024

(54) SYSTEM AND METHOD FOR OPERATING AN HINGED ADJUSTABLE ANTENNA THAT IS ADJUSTED IN A ROTATING HINGE MECHANISM

(71) Applicant: Dell Products, LP, Round Rock, TX (US)

(72) Inventor: Wei-Yu Lai, Qianzhen District (TW)

(73) Assignee: DELL PRODUCTS LP, Round Rock, TX (US)

( * ) Notice: Subject to any disclaimer, the term of this patent is extended or adjusted under 35 U.S.C. 154(b) by 125 days.

(21) Appl. No.: 17/870,155

(22) Filed: Jul. 21, 2022

(65) Prior Publication Data

US 2024/0030586 A1 Jan. 25, 2024

(51) Int. Cl.

*H01Q 1/22* (2006.01)
*H01Q 7/00* (2006.01)
*H01Q 9/16* (2006.01)
*H01Q 9/30* (2006.01)

(52) U.S. Cl.

CPC ......... *H01Q 1/2258* (2013.01); *H01Q 1/2291* (2013.01); *H01Q 7/00* (2013.01); *H01Q 9/16* (2013.01); *H01Q 9/30* (2013.01)

(58) Field of Classification Search

None
See application file for complete search history.

(56) References Cited

U.S. PATENT DOCUMENTS

2015/0102966 A1* 4/2015 Chiu ........................ H01Q 1/24 343/702
2017/0187093 A1* 6/2017 Svendsen ............. H01Q 1/2258
2018/0090840 A1* 3/2018 Yu ........................ H01Q 21/064
2018/0331415 A1* 11/2018 Wu ...................... H01Q 1/2266
2019/0131688 A1* 5/2019 Ramasamy .......... H01Q 1/2266
2022/0052451 A1* 2/2022 Yong ........................ H01Q 5/25

* cited by examiner

*Primary Examiner* — Wilson Lee
(74) *Attorney, Agent, or Firm* — Prol Intellectual Property Law, PLLC; H. Kenneth Prol

(57) ABSTRACT

A convertible information handling system comprising an antenna feed operatively coupled to a wireless adapter and an hinged adjustable antenna spanning a hinge for communicating on a wireless link, the hinge pivoting between a first antenna portion of the hinged adjustable antenna on a display chassis and a second antenna portion of an hinged adjustable antenna on a base chassis and the hinge which rotates the convertible information handling system between a first configuration and a tablet configuration and a first adjustable antenna configuration in the first configuration and a second adjustable antenna configuration in the tablet configuration, where the first adjustable antenna configuration supports a first bandwidth at the wireless adapter and the second adjustable antenna configuration supports a second bandwidth at the wireless adapter.

20 Claims, 8 Drawing Sheets

SYSTEM AND METHOD FOR OPERATING AN HINGED ADJUSTABLE ANTENNA THAT IS ADJUSTED IN A ROTATING HINGE MECHANISM

FIELD OF THE DISCLOSURE

The present disclosure generally relates to a method and apparatus for a hinged adjustable antenna within a rotating hinge mechanism for one or a plurality of radio antenna systems used with information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. For wireless communications, one or more wireless interface adapters may be used including with plural antenna systems, a front-end antenna module and other radio frequency subsystems deployed on information handling systems for data and other communications via communication and data networks.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
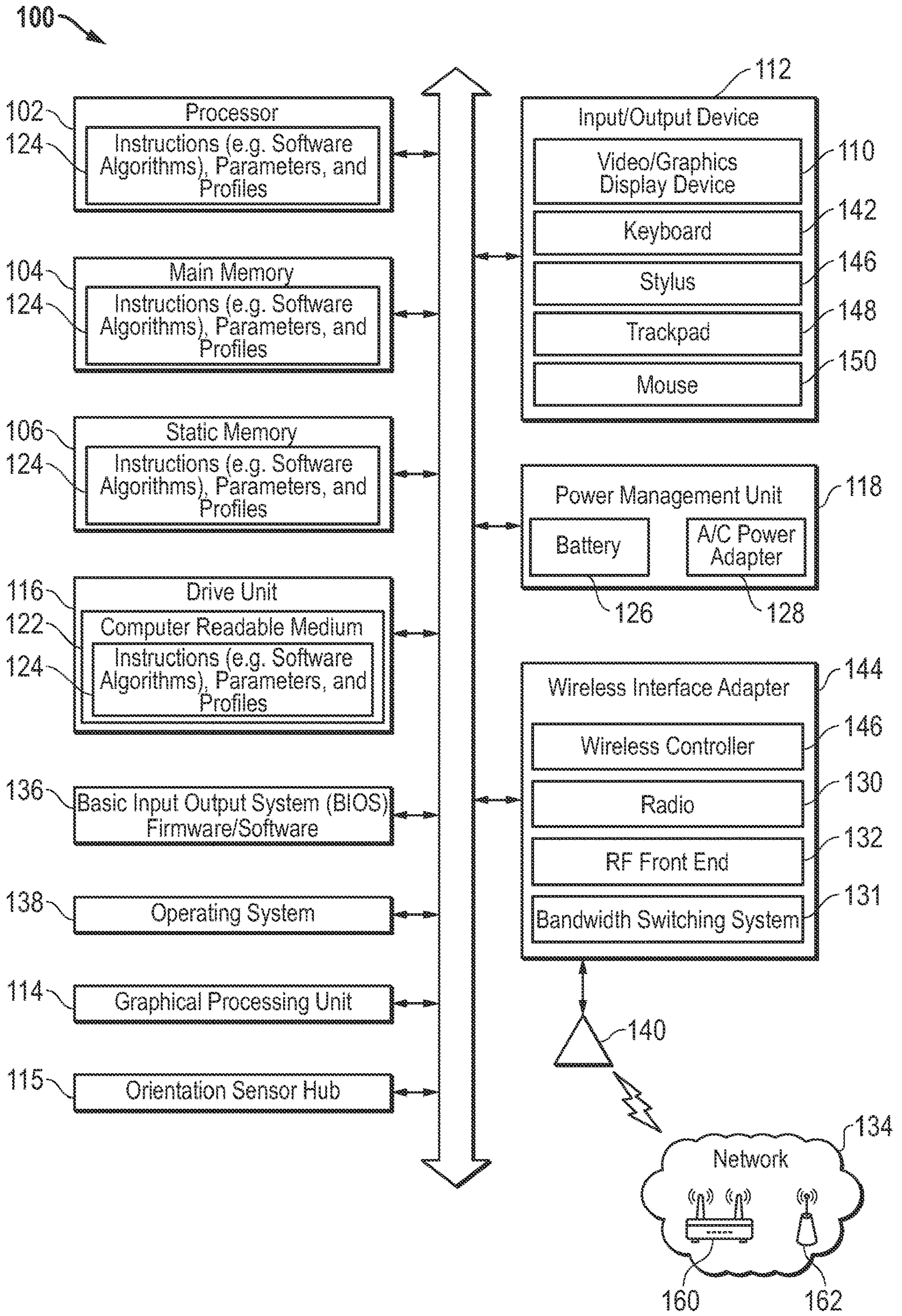
FIG. 1 is a block diagram illustrating an information handling system with an antenna according to an embodiment of the present disclosure.

The following description in combination with the Figures is provided to assist in understanding the teachings disclosed herein. Aspects within the Figures are not necessarily drawn to scale and may be estimations of position and size for purposes of explanation of various embodiments herein. The description is focused on specific implementations and embodiments of the teachings, and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system may be of a variety of models and types. For example, a personal computer may be a laptop, a 360 convertible computing device, a tablet, smart phone, wearable computing device, a dual housing convertible tablet computing device, or other mobile information handling system and may have several configurations and configuration modes. The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. In an aspect, the information handling system may have a plurality of antenna systems for communication via wireless links operating on a variety of radio access technologies (RAT). In another aspect, several antenna systems may be available for each RAT to enable aggregated data communications such as via plural multiple in, multiple out (MIMO) streams to enhance bandwidth or reliability. Antenna systems may be operated via one or more wireless adapters that may include controllers, memory and other subsystems some of which may operate as a radio frequency (RF) front end for one or more antenna systems to transmit wirelessly. Portions of an information handling system may themselves be considered information handling systems.

In some types of convertible information handling systems, a plurality of housings may be connected by a hinge structure enabling reconfiguration of the convertible information handling systems into a plurality of usage mode configurations. For example, a convertible laptop system may have a housing for a display and a housing for a keyboard which may be rotated around a hinge structure to provide for a laptop usage mode configuration and a tablet usage mode configuration in an embodiment. Further, other configurations may be available for the convertible laptop information handling system including options for the laptop usage mode, a tent mode, an easel usage mode, or other tablet usage mode configurations. In other embodiments, the convertible information handling system may include two housings which may support a single, bendable display screen or a plurality of display screens. The housings again may be operatively connected via a hinge such that the housings may rotate around the hinge with respect to one another for various usage mode configurations of the display screen or display screens including a laptop configuration, dual tablet, single tablet, tent mode, easel mode, book mode, as well as other usage mode configurations.

In the context of the present specification, the information handling system may be any type of information handling system that includes a display chassis and a base chassis such as a 360-degree or convertible laptop type information handling system. In these embodiments, the chassis of the information handling system may include a display housing that includes an "a-cover" which serves as a back cover for the display housing and a "b-cover" which may serve as the bezel for a display screen of the information handling system such as a laptop information handling system. In this example embodiment, this laptop information handling system may have a chassis that forms a base chassis. The base chassis includes top cover or a "c-cover" housing a keyboard, touchpad, speaker grill, and any other components set into the c-cover. The base chassis may include a bottom cover or a "d-cover" housing a processing device, memory the PMU, wireless interface adapter and other components of the information handling system in the base chassis for the laptop information handling system.

A convertible laptop information handling system may have antenna windows with a first portion of a hinged adjustable antenna mounted in the display chassis and a second portion of a hinged adjustable antenna mounted in the base chassis formed by the covers about the hinge mechanism in some embodiments. This structure may form one or more types of hinged adjustable antenna system that may be adjusted and reconfigured with rotation of the hinge mechanism for transceiving antenna operation at a plurality of wireless link frequency ranges that depend on the configuration of the convertible information handling system according to embodiments herein. In some particular embodiments, the hinged adjustable antenna may reconfigure between a dipole antenna and a loop antenna or between a loop antenna to a monopole antenna about a rotation of the hinge mechanisms according to aspects herein.

FIG. 1 illustrates an information handling system 100 similar to information handling systems according to several aspects of the present disclosure. The information handling system 100 may be of a variety of models and types. For example, the information handling system 100 may be a personal computer such as a laptop, a 360 convertible computing device, a tablet, smart phone, wearable computing device, a dual housing convertible tablet computing device, or other mobile information handling system and may have several configurations and configuration modes. Further, information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with a head-mounted display 120 and provide data storage resources, processing resources, and/or communication resources to the head-mounted display 120 as described herein. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as the processor 102, a central processing unit (CPU), a graphics processing unit (GPU) 114, accelerated processing unit (APU), a microprocessor, a microcontroller, a digital signal processor (DSP), a vision processing unit (VPU), an application specific integrated circuit (ASIC), a reduced instruction set computer (RISC), a complex instruction set computer (CISC), a super scalar processor, or any combination thereof. Any of the processing resources may operate to execute code that is either firmware or software code. Additional components of the information handling system 100 can include one or more storage devices such as a main memory 104, static memory 106, or drive unit 116 each with computer readable medium 122 storing instructions 124 of one or more software or firmware applications according to embodiments of the present disclosure. Storage devices such as main memory 104, static memory 106, or drive unit 116 may be volatile (e.g., random-access memory, etc.), non-volatile (read-only memory, flash memory etc.), magnetic memory, optical memory, or any combination thereof. In an embodiment, the information handling system 100 may include one or more communications ports for communicating with external devices, as well as various input and output (I/O) devices 112. The information handling system 100 can also include one or more buses 108 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described above. The information handling system 100 may execute code instructions 124 via one or more processing resources that may operate on servers or systems, remote data centers, or on-box in individual client information handling systems according to various embodiments herein. In some embodiments, it is understood any or all portions of code instructions 124 may operate on a plurality of information handling systems 100.

As shown, the information handling system 100 may further include a video display device 110 or plural video display devices 110. The video display device 110 in an embodiment may function as a liquid crystal display (LCD), an organic light emitting diode (OLED), a flat panel display, or a solid-state display. Additionally, the information handling system 100 may include one or more input/output devices 112 including an alpha numeric input device such as a keyboard 142 and/or a cursor control device, such as a mouse 150, touchpad/trackpad 148, a stylus 146, or a gesture or touch screen input device associated with the video display device 110.

The network interface device shown as wireless interface adapter 144 can provide connectivity to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 160 or base station 162 used to operatively coupled the information handling system 100 to a network 134. In a specific embodiment, the network 134 may include macro-cellular connections via one or more base stations 162 or a wireless access point 160 (e.g., WLAN such as Wi-Fi), or such as through licensed or unlicensed WWAN small cell base stations 162. Connectivity may be via wired or wireless connection. For example, wireless network access points 160 or base stations 162 may be operatively connected to the information handling system 100 via one or more wireless protocols operating on radio subsystems 130. The wireless interface adapter 144 may include one or more radio frequency (RF) subsystems (e.g., radio 130) with transmitter/receiver circuitry, modem circuitry, one or more antenna front end circuits 132, one or more wireless controller circuits 146, amplifiers, antennas 140 and other circuitry of the radio 130 such as one or more antenna ports used for wireless communications via multiple radio access technologies (RATs). The radio 130 may communicate with one or more wireless technology protocols. In and embodiment, the radio 130 may contain individual subscriber identity module (SIM) profiles for each technology service provider and their available protocols for any operating subscriber-based radio access technologies such as cellular LTE communications. Antennas 140 may include any antenna or metallic structure of the information handling system that may receive or transmit a radiofrequency signal generated by the radio subsystems 130. Antenna 140 may be reconfigurable and comprise a hinged adjustable antenna 140 according to one or more embodiments of the present disclosure. For example, hinged adjustable antenna 140 includes one or more antenna portions etched onto a radiofrequency transparent antenna holder to be mounted in a base chassis and display chassis on either side of a hinge mechanism according to embodiments herein. The radiofrequency transparent antenna holder and hinged adjustable antenna 140, including a base chassis portion and a display chassis portion are operatively coupled to the RF front end 132, radio subsystem 130, and a bandwidth switching system 131 of the wireless interface adapter 144 with a radio feed via that may, in part, articulate or adjust with the rotating hinge mechanism between the base chassis portion and a display chassis portion in embodiments herein. In some particular embodiments, the hinged adjustable antenna 140 may be reconfigured between a dipole antenna and loop antenna or between a loop antenna and a monopole antenna capable of transceiving at one or more frequency ranges depending on convertible information handling system configuration. Plural hinged adjustable antennas with a base chassis portion and a display chassis portion may be deployed on the information handling system 100 at various hinge locations in some embodiments. Further, in some embodiments, the hinged adjustable antenna or antennas 140 deployed with a base chassis portion and a display chassis portion along a hinge mechanism may work with one or more radio subsystems 130 while plural other antennas 140 deployed in other locations on the information handling system may work with the same or different radio subsystems 130.

The configuration mode of the convertible information handling system 100 may be detected by one or more configuration sensors operably coupled to a configuration sensor hub 115. Configuration sensors such as an accelerometer, configuration reference sensor, gyroscope, angle sensor, Hall effect sensor, infrared sensor, light sensor, camera, or other sensor may be used to determine which configuration the base chassis and the display chassis are in relative to one another for a convertible information handling system 100 according to embodiments herein. In particular, the configuration sensors may be used to detect a laptop mode, tablet mode or other configuration modes as described in embodiments herein. Depending on the configuration mode detected by the configuration sensor hub 115 and associated sensors, the antenna configuration the hinged adjustable antenna may be determined according to embodiments herein. The antenna configuration of the hinged adjustable antenna may trigger a bandwidth switching structure 131, such as a switch in the radiofrequency front end 132 of wireless interface adapter to switch antenna feeds to one or more radios 130 or a wireless controller 146 to adjust the radio frequencies transmitted and received by a radio 130 in some embodiments. In other embodiments, the detected configuration of the convertible information handling system may trigger the bandwidth switching system 131 to cause the wireless controller 146 to operably couple the hinged adjustable antenna 140 to the radio frequency bandwidth accommodated by the current antenna configuration via the switching the frequency generated at radio 130 coupled via the RF front end 132. In a particular example embodiment, detection of a laptop configuration mode may indicate a first type of antenna configuration and structure supporting a first frequency bandwidth, while detection of a tablet configuration mode may indicate that a second type of antenna configuration supporting a second frequency bandwidth.

In an example embodiment, the wireless interface adapter 144, radio 130, and antenna 140 may provide wireless connectivity with Wi-Fi 802.11 radio protocol, 5G NR radio protocols, or other wireless protocols to operatively couple the information handling system 100 to the network 134. In an embodiment, a wireless controller 146 may control the radio 130, the bandwidth switching system 131 and the RF front end 132 for the hinged adjustable antenna 140 operatively coupled to an operating system (OS) 138. In this way, the hinged adjustable antenna 140 may concurrently transceive data via one or more wireless protocols of the radio subsystems 130 available in one or more wireless interface adapters 144. In one embodiment, the wireless interface adapter 144, radio 130, and antenna 140 may operate under a Wi-Fi protocol or other wireless protocol at two or more wireless protocol frequency ranges with the hinged adjustable antenna 140 and may switch between wireless protocol frequency ranges depending on the configuration of the convertible laptop information handling system and the reconfiguration of the hinged adjustable antenna about the hinge mechanism. The wireless interface adapter 144, radio 130, and hinged adjustable antenna 140 may detect the configuration of the convertible information handling system 100 and adjust the wireless frequency range, via the bandwidth switching system 131, used with hinged adjustable antenna 140 according to embodiments of the present disclosure. In further embodiments, wireless interface adapter 144, radio 130, and antenna 140 may operate with one or more of the peripheral devices that may include a wireless video display device 110, a wireless keyboard 142, a wireless mouse 150, a wireless headset (not shown), a wireless stylus 146, and a wireless trackpad 148 among other wireless peripheral devices used as input/output (I/O) devices 112. In an embodiment, any wireless peripheral devices may wirelessly couple with Bluetooth radio protocols.

As described, the wireless interface adapter 144 may include any number of antennas 140 which may include any number of hinged adjustable antennas for use with the system and methods disclosed herein as well as other antennas 140 deployed on the information handling system 100. Although FIG. 1 shows a single antenna 140, the present specification contemplates that the number of antennas 140, both adjustable or fixed antennas, that may include more than the number of individual antennas shown in FIG. 1. Additional antenna system modification circuitry (not shown) may also be included with the wireless interface adapter 144 to implement coexistence control measures via an antenna wireless controller 146 as described in various embodiments of the present disclosure.

The wireless interface adapter 144 can represent an add-in card, wireless network interface module that is integrated with a main board of the information handling system or integrated with another wireless network interface capability, or any combination thereof. In an embodiment the wireless interface adapter 144 may include one or more radio frequency subsystems including transmitters and wireless controllers for connecting via a multitude of wireless links. In an example embodiment, an information handling system 100 may have an antenna system transmitter for 5G small cell WWAN, Wi-Fi WLAN connectivity and one or more additional antenna system transmitters for macrocellular communication. The RF subsystems and radios 130 include wireless controllers to manage authentication, connectivity, communications, power levels for transmission, buffering, error correction, baseband processing, and other functions of the wireless interface adapter 144.

The information handling system 100 can include a set of instructions 124 that can be executed to cause the computer system to perform any one or more of the methods or computer-based functions disclosed herein. For example, instructions 124 may execute various software applications, software agents, or other aspects or components that may operate on the information handling system 100. Various software modules comprising application instructions 124 may be coordinated by an operating system (OS) 138, and/or via an application programming interface (API). An example OS 138 may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 such as a CPU, or other processing resources such as processing resource 165 to perform the methods described herein. Similarly, main memory 104 and static memory 106 may also contain a computer-readable medium for storage of one or more sets of instructions, parameters, or profiles 124 described herein. The disk drive unit 116 or static memory 106 also contain space for data storage. Further, the instructions 124 may embody one or more of the methods or logic as described herein. In a particular embodiment, the instructions, parameters, and profiles 124 may reside completely, or at least partially, within the main memory 104, the static memory 106, and/or within the disk drive 116 during execution by the processor 102 or GPU 114 of information handling system 100 or processing resource 165 of the handheld controller 152. The main memory 104, static memory 106, or processing resources 102, GPU 114, or processing resources 165 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding, or carrying a set of instructions for execution by a processor or that cause a computer system to perform any one or more of the methods or operations disclosed herein.

In an embodiment, the information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device 110 or other input/output devices 112 such as the stylus 146, and other components that may require power when a power button has been actuated by a user. In an embodiment, the PMU 118 may monitor power levels and be electrically coupled, either wired or wirelessly, to the information handling system 100 to provide this power and coupled to bus 108 to provide or receive data or instructions. The PMU 118 may be coupled to the antenna controller to control the wireless radio 130 of the information handling system 100 as described herein. The PMU 118 may regulate power from a power source such as a battery 126 or A/C power adapter 128. In an embodiment, the battery 126 may be charged via the A/C power adapter 128 and provide power to the components of the information handling system 100 via a wired connections as applicable, or when A/C power from the A/C power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In various embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
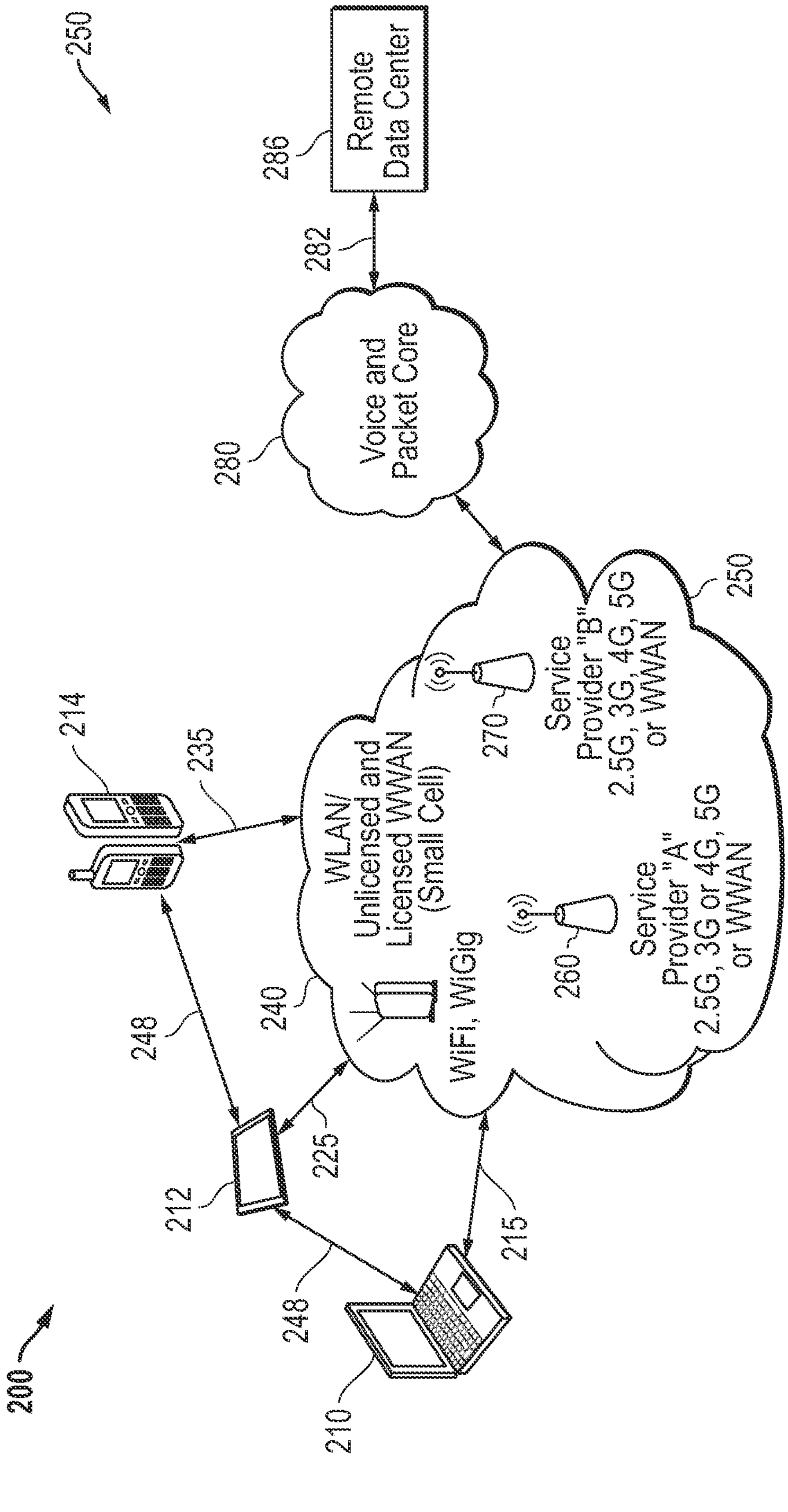
FIG. 2 is a block diagram of a network environment offering several communication protocol options and mobile information handling systems according to an embodiment of the present disclosure.

FIG. 2 illustrates a network 200 that can include one or more information handling systems 210, 212, 214. The information handling systems 210, 212, 214 shown in FIG. 2 may be similar to the information handling system 100 described in connection with FIG. 1, respectively. For example, any of the information handling systems may utilize one or more antenna systems with the horseshoe hinge frame antenna holder and antenna of embodiments herein. In a particular embodiment, network 200 includes networked mobile information handling systems 210, 212, 214, wireless network access points, and multiple wireless connection link options. A variety of additional computing resources of network 200 may include client mobile information handling systems, data processing servers, network storage devices, local and wide area networks, or other resources as needed or desired. As partially depicted, information handling systems 210, 212, 214 may be a laptop computer, tablet computer, 360-degree convertible systems, wearable computing devices, or a smart phone device. These information handling systems 210, 212, 214, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option. Plural hinged adjustable antennas or fixed antennas may be deployed on information handling systems 210, 212, or 214 and located across the base chassis or display chassis spanning a hinge mechanism to communicate wirelessly via WLAN 240, WWAN 250 or other wireless network connections according to embodiments herein.

Since WPAN or Wi-Fi Direct connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points (e.g., 160 FIG. 1) or base stations (e.g., 162, FIG. 1) may be connected to a wireless network controller and an Ethernet switch. Wireless communications across wireless local network 240 may be via standard protocols such as IEEE 802.11 Wi-Fi (e.g., Wi-Fi 2.4 GHz or 5 GHz), IEEE 802.1lad WiGig, IEEE 802.15 WPAN, IEEE 802.11ax-2021, (e.g., Wi-Fi 6 and 6E, at 2.4 GHz, 5 GHz, or 6 GHz technologies), or emerging 5G small cell WWAN communications such as gNodeB, eNodeB, or similar wireless network protocols and access points. Alternatively, other available wireless links within network 200 may include macro-cellular connections 250 via one or more service providers 260 and 270. As described herein, a plurality of antennas may be operatively coupled to any of the macro-cellular connections 250 via one or more service providers 260 and 270 or to the wireless local area networks (WLANs) selectively based on the SAR data, RSSI data, configuration data, system operation and connection metrics, peripheral telemetry data, and antenna mounting locations (e.g., spatial locations of antennas within the information handling system) associated with each information handling systems 210, 212, 214 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. The hinged adjustable antenna that may be adjusted via actuation of a hinge mechanism to change configuration of a convertible laptop information handling system at 210, 212 or 214 may reconfigure between antenna portion configurations to form different antenna types that may support 2.4 GHz, 5 GHz or even 6 GHz depending on configuration in some example embodiments described herein.

WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 240, 250 may be based on the radio access network (RAN) standards that implement, for example, eNodeB or gNodeB hardware connected to mobile phone networks (e.g., cellular networks) used to communicate with the information handling systems 210, 212, and 214. In the example embodiment, mobile one or more information handling systems 210, 212, 214 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling systems 210, 212, 214 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments, a networked mobile information handling system 210, 212, and 214 may have a plurality of wireless network interface systems capable of transmitting simultaneously within a shared communication frequency band or toggling between frequency bands for transceiving communications depending on the configuration of a convertible information handling system 210, 212, 214. That communication within a shared communication frequency band may be sourced from different protocols on parallel wireless network interface systems or from a single wireless network interface system capable of transmitting and receiving from multiple protocols. Similarly, a single antenna or the plurality of antennas, in any combination of hinged adjustable antennas or fixed antennas, in each information handling systems 210, 212, or 214 may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Within local portion of wireless network 250 access points for Wi-Fi or WiGig as well as small cell WWAN connectivity may be available in emerging 5G technology. This may create situations where a plurality of antenna systems are operating on a mobile information handling system 210, 212, 214 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein. The antenna may cooperate with other antennas in a N×N MIMO array configuration according to the embodiments described herein. Alternatively, embodiments may include a single transceiving antennas capable of receiving and transmitting, and/or more than one transceiving antennas. Each of the antennas included in the information handling systems 210, 212, and 214 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 212, 214, or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more information handling systems 210, 212, or 214. Alternatively, mobile information handling systems 210, 212, or 214 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 212, and 214 allowing streamlining and efficiency within those devices.

Although communication links 215, 225, and 235 are shown connecting wireless adapters of information handling systems 210, 212, 214 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile information handling systems 210, 212, 214 may communicate intra-device via inter-communication links 248 when one or more of the information handling systems 210, 212, 214 are set to act as an access point or even potentially an WWAN connection via small cell communication on licensed or unlicensed WWAN connections. For example, one of mobile information handling systems 210, 212, 214 may serve as a Wi-Fi hotspot in an embodiment. Concurrent wireless links to information handling systems 210, 212, 214 may be connected via any access points including other mobile information handling systems as illustrated in FIG. 2.

Figure 3A:
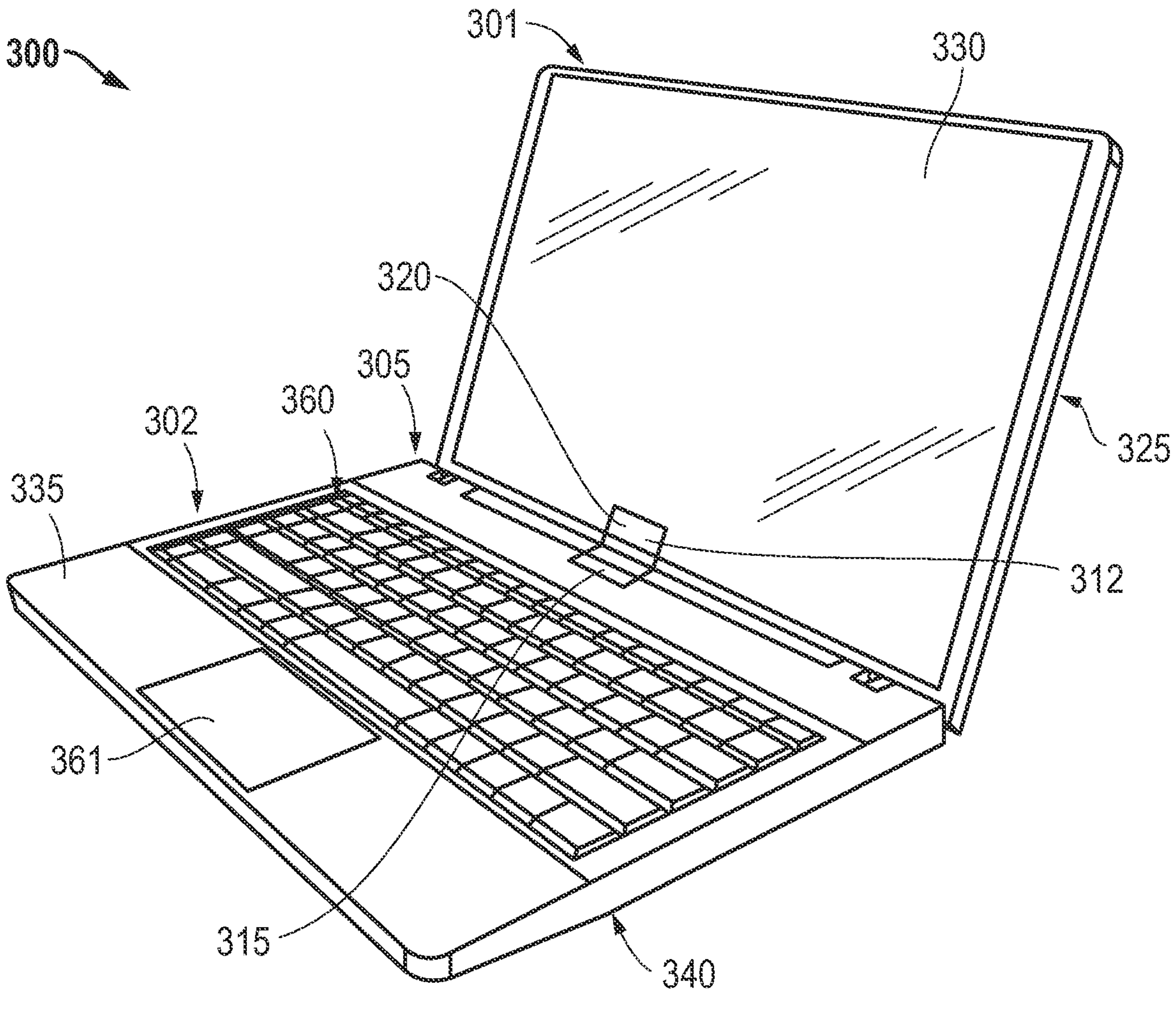
FIG. 3A is a perspective view of an information handling system showing a laptop configuration and including a hinge structure with the location of a hinged adjustable antenna according to an embodiment of the present disclosure.
Figure 3B:
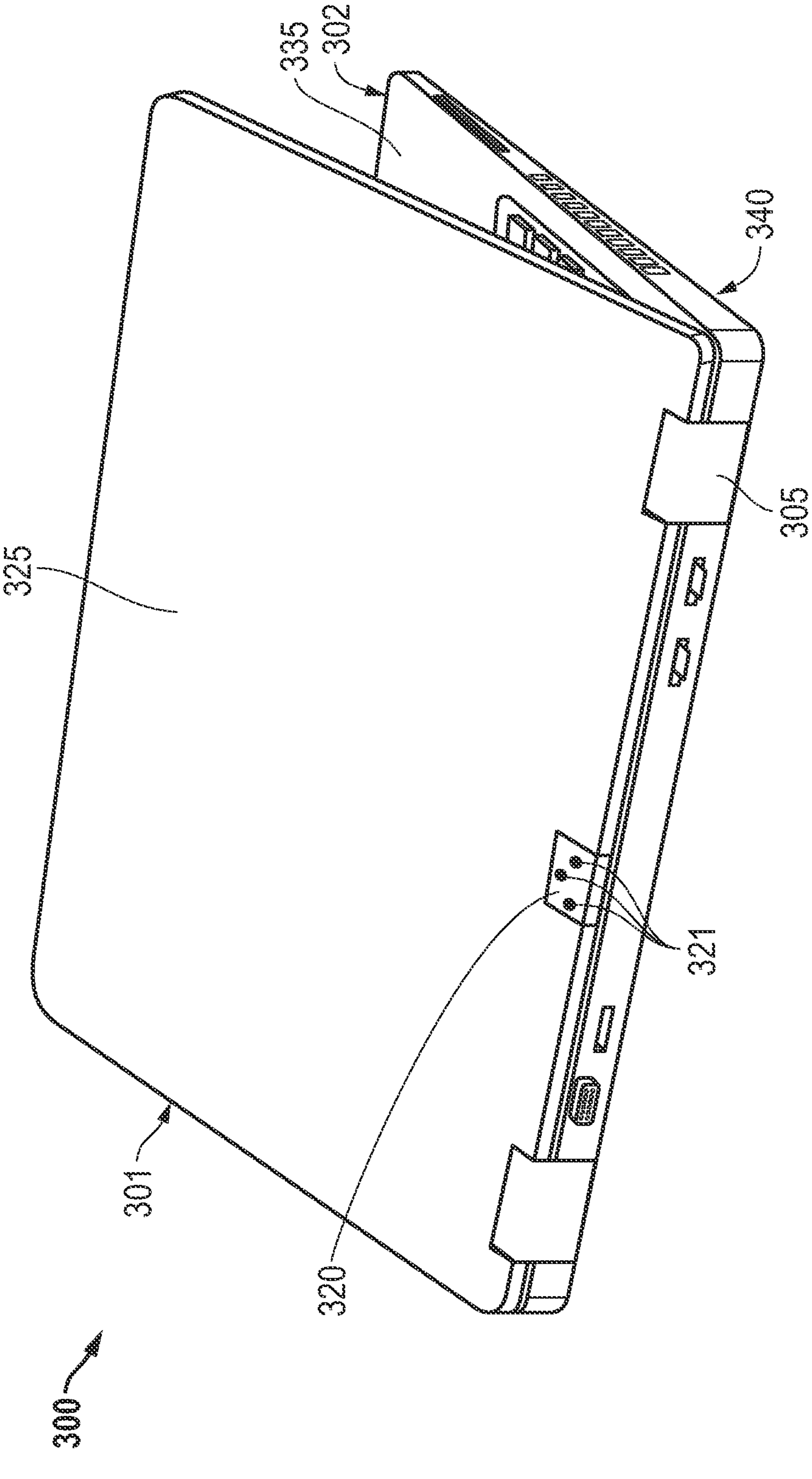
FIG. 3B is a back perspective view of an information handling system showing a display chassis cover and including a hinge structure with the location of a hinged adjustable antenna according to an embodiment of the present disclosure.
Figure 3C:
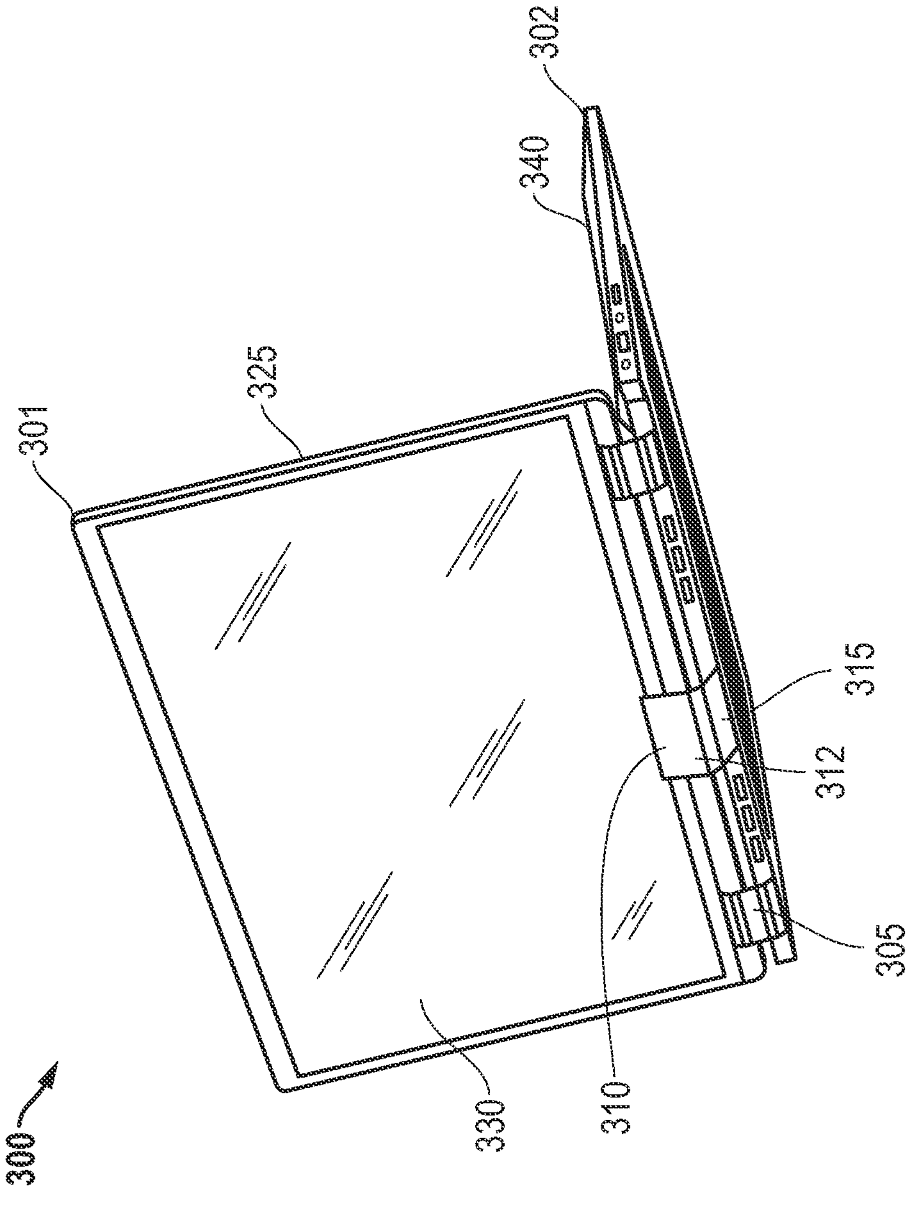
FIG. 3C is a perspective view of an information handling system showing a transition to a tablet configuration and including a hinge structure with the location of a hinged adjustable antenna according to an embodiment of the present disclosure.

FIG. 3A is a convertible information handling system 300 according to an embodiment of the present disclosure. In the embodiment shown, the information handling system 300 is a convertible laptop type information handling system, however it is contemplated that a dual screen convertible information handling system may also utilize embodiments of the present disclosure. The convertible information handling system 300 is shown in a first usage mode configuration that is illustrated as a laptop configuration, and capable of transitioning to other usage mode configurations, as shown in FIGS. 3B and 3C below and discussed in embodiments herein, including a second usage mode configuration that may be a tablet configuration according to embodiments herein. The convertible information handling system 300 may rotate about hinge 305 to articulate a first chassis, such as display chassis 301, with respect to a second chassis, such as the base chassis 302. In an embodiment, the second chassis may be a second display chassis (not shown) of a dual display convertible information handling system. In embodiments herein, the convertible information handling system 300 may transition from a closed configuration to a laptop configuration and to tablet configuration, including other configurations in between according to the embodiments described herein. The hinge mechanism 305 may operatively couple the first chassis, such as the display chassis 301, with the second chassis, such as the base chassis 302 and may include power cabling or other coupling, communication cabling or other coupling, as well as a mechanical coupling between the first chassis (e.g., display chassis 301) and the second chassis (e.g., base chassis 302) that span the hinge 305. In embodiments herein, a single hinge structure mechanism or plural hinge structures be used to form hinge 305. In further embodiments, hinge 305 may be of any hinge type used with convertible information handling systems 300 that permit up to 360 degrees of rotation of a first or display chassis 301 relative to a second or base chassis 302. In a further embodiment, hinge 305 may be an articulated hinge to provide a wider sweep of rotation for a display chassis 301 relative to a base chassis 302 for the convertible laptop type information handling system 300 to allow the display chassis 301 to lay flat on the base chassis 302 in either a closed configuration or a tablet configuration.

The display chassis 301 may include a back cover or a-cover 325 and a bezel and display or b-cover 330 in an embodiment. As described herein, such a display chassis 301 is designed to be very thin and often the a-cover 325 is comprised of metal for aesthetic reasons. Further, the bezel width around the display of b-cover 330 is designed to be narrow but may accommodate, along with a portion of the display in some embodiments, a first adjustable antenna portion 320 for aesthetic reasons.

The base chassis 302 includes a top cover or c-cover 335 which may include a keyboard, touchpad, and other keys and buttons thereon. As described the second or base chassis 302 may be a second display chassis in embodiments of a dual-display convertible information handling system. The base chassis 302 also includes a bottom cover or d-cover 340 which frequently houses many of the internal components of the information handling system 300 with the c-cover 335 to form base chassis 302. These information handling system components may include several of those described in FIG. 1 such as processing resources, memory and data storage, power systems and control, a motherboard or graphics systems, or a wireless interface device, among several others. The base chassis 302 is also designed to be thin and compact in many modern information handling systems and further some or all of the c-cover and d-cover may be comprised of metal for aesthetic and functional reasons as described herein. The c-cover 335 may house one or more input/output devices such as a keyboard 360 or a touchpad 361 in an embodiment. In other embodiments, a second display may be housed (not shown).

Further, the convertible information handling system 300 may include a hinged adjustable antenna 312 that spans hinge 305 according to embodiments of the present disclosure. The hinged adjustable antenna may be at location 312 and may include antenna windows in the first or display chassis 301 as well as in the second or base chassis 302 in an embodiment. The hinged adjustable antenna at location 312 further includes a first adjustable antenna portion 320 as part of the first or display chassis 301 and a second adjustable antenna portion 315 as part of the second or base chassis 302. The hinged adjustable antenna 312 is formed to reconfigure to plural antenna configurations as the convertible information handling system 300 reconfigures between usage mode configurations. Reconfiguration of between a first usage mode configuration such as laptop configuration and a second usage mode configuration such as a tablet configuration also enables the hinged adjustable antenna 312 to reconfigure between a first hinged antenna configuration and a second hinged antenna configuration according to embodiments described further herein. The hinged adjustable antenna 312 has a rotatable portion between the first adjustable antenna portion 320 and the second adjustable antenna portion 315 according to various embodiments including a bendable antenna holder section or a rotatable coaxial cable link between the first adjustable antenna portion 320 and the second adjustable antenna portion 315. An antenna feed may be operably coupled along any portion of the first adjustable antenna portion 320, the rotatable portion, or the second adjustable antenna portion 315 depending on the antenna configurations to be used during reconfiguration as with embodiments of the present disclosure.

According to embodiments herein, as the convertible information handling system 300 rotates around hinge 305 between usage mode configurations, the first adjustable antenna portion 320 as part of the first or display chassis 301 and the second adjustable antenna portion 315 as part of the second or base chassis 302 may rotate around the hinge 305 as well. This may provide for a first adjustable hinge configuration to form a first hinged adjustable antenna type due to the position of the first adjustable antenna portion 320 being relatively separate from the second adjustable antenna portion 315 when the convertible information handling system 300 is in the first usage mode configuration. For example, where the first usage mode configuration is the laptop configuration in the shown embodiment, the first adjustable antenna portion 320 as part of the first or display chassis 301 is separated from the second adjustable antenna portion 315 as part of the base chassis 302 but linked via a rotatable portion. In such an embodiment, the first adjustable hinge antenna configuration is formed from transceiving antenna structures active in separated parts of both the first adjustable antenna portion 320 in the first or display chassis 301 and the second adjustable antenna portion 315 in the second or base chassis 302 in an embodiment. This first adjustable hinge antenna configuration forms a first usable antenna type with a dimensions and orientation to support a first frequency bandwidth.

In a second usage mode configuration of the convertible information handling system 300, such as a tablet configuration, the first adjustable antenna portion 320 in the first or display chassis 301 and the second adjustable antenna portion 315 in the second or base chassis 302 may be folded over on one another to form a second adjustable hinge configuration for a second usable antenna type with a dimensions and orientation to support a second frequency bandwidth in an embodiment. As discussed below, the transceiving antenna structures active are folded over one another about the hinge 305 and one or more portions electrically coupled such that the overlapping parts of both the first adjustable antenna portion 320 in the first or display chassis 301 and the second adjustable antenna portion 315 in the second or base chassis 302 form the second adjustable hinged antenna configuration in an embodiment. The second adjustable hinged antenna configuration forms a second usable antenna type and this folded over second adjustable antenna configuration has dimensions and orientation to support second frequency bandwidth.

FIG. 3B is a convertible information handling system 300 according to another embodiment of the present disclosure. In the embodiment shown, the information handling system 300 is a convertible laptop type information handling system. However, it is contemplated that a dual screen convertible information handling system may also utilize embodiments of the present disclosure. The convertible information handling system 300 is shown transitioning to a closed mode but also illustrates the location of a first adjustable antenna portion 320 of the hinged adjustable antenna according to embodiments herein. The first adjustable antenna portion 320 of the hinged adjustable antenna is shown from a back perspective of the top cover or a-cover 325 of a first chassis or display chassis 301 in an embodiment. The convertible information handling system 300 is rotated about hinge 305 toward a closed configuration such that display chassis 301 is closing over a second chassis, such as the base chassis 302 and is in a closed configuration when the display chassis 301 is parallel or closed over the c-cover 335 of base chassis 302. Base chassis 302 is comprised of a c-cover 335 and bottom or d-cover 340. In another embodiment, the second chassis may be a second display chassis (not shown) of a dual display convertible information handling system. As before, the hinge mechanism 305 may operatively couple the first chassis, such as the display chassis 301, with the second chassis, such as the base chassis 302 and may include power cabling or other coupling, communication cabling or other coupling, as well as a mechanical coupling between the first chassis (e.g., display chassis 301) and the second chassis (e.g., base chassis 302) that span the hinge 305. In embodiments herein, a single hinge structure mechanism or plural hinge structures be used to form hinge 305 and permit up to 360 degrees of rotation of a first or display chassis 301 relative to a second or base chassis 302.

In the shown embodiment of FIG. 3B, the display chassis 301 includes a back cover or a-cover 325 enclosing a first adjustable antenna portion 320 of the hinged adjustable antenna according to embodiments herein. The first adjustable antenna portion 320 of the hinged adjustable antenna may have an antenna window at 320 which, in some embodiments, may be capable of transceiving wireless communications via the first adjustable antenna portion 320 of the hinged adjustable antenna through the back or a-cover 325. In other embodiments, the first adjustable antenna portion 320 of the hinged adjustable antenna may not need to transmit through the back or a-cover and does not have an antenna window at 320, only one or more antenna contact points 321 in some embodiments. The first adjustable antenna portion 320 of the hinged adjustable antenna may include one or more antenna contact points 321 for operably and electrically coupling one or more points of the first adjustable antenna portion 320 to a second adjustable antenna portion (not shown) in the base chassis 302 of the hinged adjustable antenna spanning hinge 305. Thus, when the first adjustable antenna portion 320 is folded over onto the second adjustable antenna portion (not shown) in a tablet configuration, a newly configured antenna type may result. It is contemplated, but not shown in the perspective of FIG. 3B, that one or more corresponding antenna contact points on the bottom or d-cover may align with and receive the one or more antenna contact points 321 of the top or a-cover as shown. These corresponding antenna contact points on the bottom cover operably or electrically couple to the second adjustable antenna portion in the base chassis 302.

In other embodiments where first adjustable antenna portion 320 of the hinged adjustable antenna may not transmit or receive wireless communications through the back or a-cover 325, then 320 only depicts a location of the first adjustable antenna portion 320. In such an embodiment, the location of the first adjustable antenna portion 320 of the hinged adjustable antenna includes the one or more antenna contact points 321 for contacting one or more points of the first adjustable antenna portion 320 to a second adjustable antenna portion in the base chassis 302 of the hinged adjustable antenna spanning hinge 305 as described in an embodiment of a tablet configuration. In the embodiment of FIG. 3B, the one or more corresponding antenna contact points on the bottom or d-cover may align with and receive the one or more antenna contact points 321 of the top or a-cover as shown to provide for and enable a second adjustable antenna configuration to for a second antenna type in a tablet configuration of the convertible information handling system 300. This second antenna type may support a second radiofrequency bandwidth in some embodiments.

FIG. 3C is a convertible information handling system 300 according to yet another embodiment of the present disclosure. In the embodiment shown, the information handling system 300 is a convertible laptop type information handling system. However, as before, it is contemplated that a dual screen convertible information handling system may also utilize embodiments of the present disclosure. The convertible information handling system 300 is shown transitioning to a tablet mode and illustrates the location of a first adjustable antenna portion 320 relative to the second adjustable antenna portion 315 of the hinged adjustable antenna spanning hinge 305 according to embodiments herein. The convertible information handling system 300 is rotated about hinge 305 toward a tablet configuration such that display chassis 301 is fully opened and wraps around behind the second chassis, for example, the base chassis 302. The convertible information handling system 300 is in a tablet configuration when the display chassis 301 is parallel and fully opened behind the d-cover 340 of the second chassis or base chassis 302. Base chassis 302 is comprised of a c-cover 335 and bottom or d-cover 340. In another embodiment, the second chassis may be a second display chassis (not shown) of a dual display convertible information handling system. As before, the hinge mechanism 305 may operatively couple the first chassis, such as the display chassis 301, with the second chassis, such as the base chassis 302 and may include power cabling or other coupling, communication cabling or other coupling, as well as a mechanical coupling that span the hinge 305 between the first chassis (e.g., display chassis 301) and the second chassis (e.g., base chassis 302).

In the shown embodiment of FIG. 3C, the first adjustable antenna portion 320 of the hinged adjustable antenna may have an antenna window at 320 which, in some embodiments, may be capable of transceiving wireless communications via the first adjustable antenna portion 320, but while in a second antenna configuration. The second adjustable antenna configuration may include the first adjustable antenna portion 320 of the hinged adjustable antenna folded over onto the second adjustable antenna portion 315 in an embodiment. In an embodiment, the hinged adjustable antenna is reconfigured into a second adjustable antenna configuration that may include one or more antenna contact points operably and electrically coupled between the first adjustable antenna portion 320 and the second adjustable antenna portion 315 when the a-cover or top cover 325 comes into contact with the d-cover or bottom cover 340 in tablet configuration. It is contemplated, that the second adjustable antenna configuration of the first adjustable antenna portion 320 folded over onto and electrically coupled to the second adjustable antenna portion 315 will form a second antenna type in tablet configuration that is different from the first antenna type when the convertible information handling system 300 is in laptop configuration or another user mode configuration. As described in embodiments herein, the second adjustable antenna configuration supports a second, different radiofrequency bandwidth than the first adjustable antenna configuration due to the orientation and dimensions of the newly formed antenna type. Example embodiments are shown and discussed further in FIGS. 4 and 5.

Figure 4:
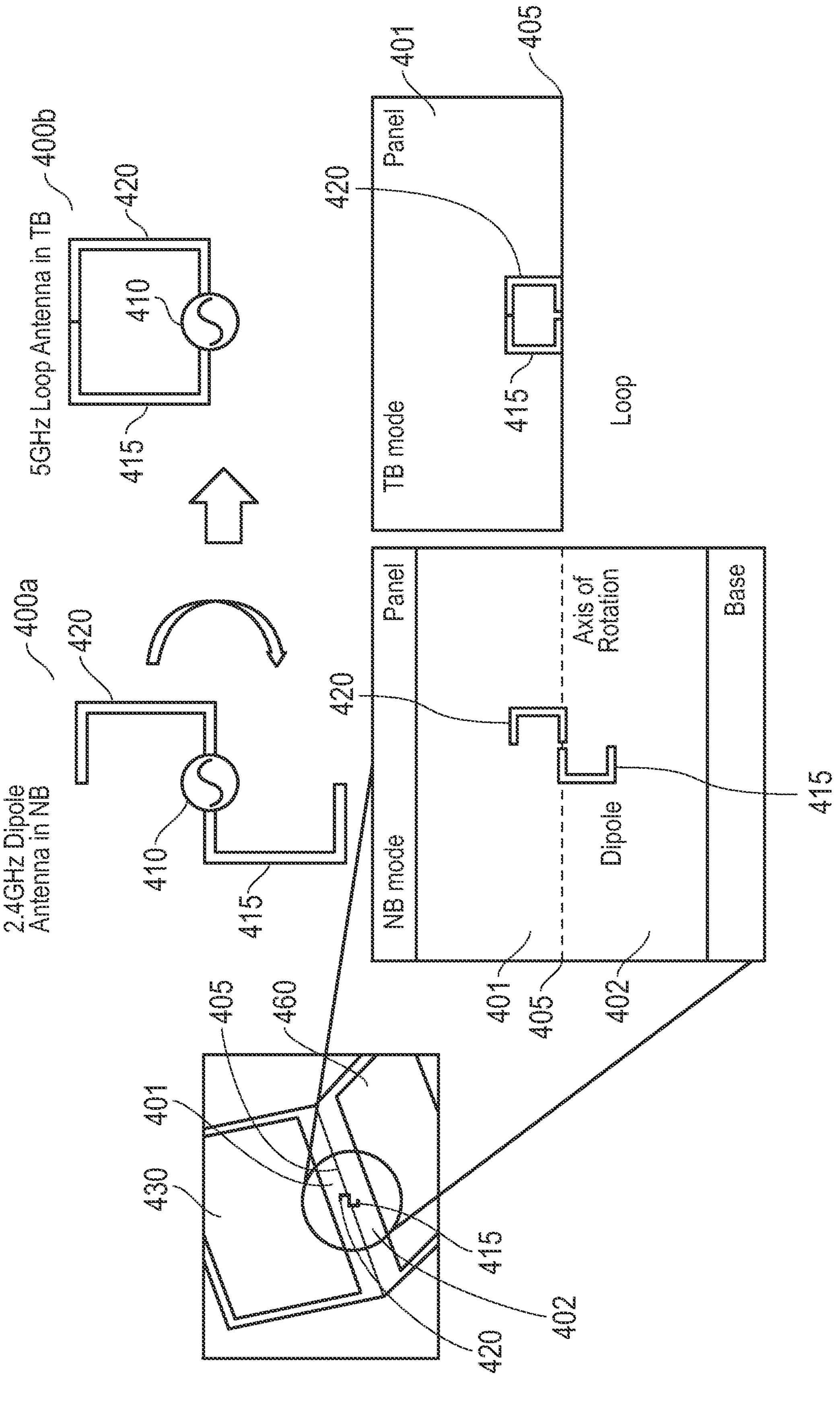
FIG. 4 is a closeup perspective top view of a hinged adjustable antenna for an information handling system and its transition between a first adjustable antenna configuration and a second adjustable antenna configuration about a hinge structure according to an embodiment of the present disclosure.

FIG. 4 shows a hinged adjustable antenna for a convertible information handling system transitioning between a first adjustable antenna configuration 400*a* and a second adjustable antenna configuration 400*b* according to an embodiment of the present disclosure. According to the embodiment of FIG. 4, a closeup view of the hinged adjustable antenna is shown with a first adjustable antenna portion 420 and a second adjustable antenna portion 415. The first adjustable antenna portion 420 is shown as part of a display chassis 401 and set behind a display panel 430 or an antenna window in various embodiments. The second adjustable antenna portion 415 is shown as part of a second chassis or base chassis 402 of a convertible information handing system according to an embodiment. The second adjustable antenna portion 415 may be set behind and antenna window or a radiofrequency transparent material of the c-cover of base chassis 402 in various embodiments. In one embodiment second chassis may be a base chassis 415 such as for housing a keyboard 460. In another embodiment, the second chassis may be a second display chassis. The hinged adjustable antenna is shown as spanning a hinge mechanism 405 in the embodiment of FIG. 4.

In a first user mode configuration, such as a laptop configuration, of the convertible information handling system, the hinged adjustable antenna forms a dipole antenna with an oscillator feed location 410 located between two arms of the hinged adjustable antenna in an embodiment. Those arms may include a first adjustable antenna portion 420 that extends up with the display chassis 401 and a second adjustable antenna portion 415 that extends into the base chassis 402, but in a different direction from the first adjustable antenna portion 420. In an embodiment, the antenna arms of the hinged adjustable antenna may be formed as a metallic trace on a flexible printed circuit that may hinge or fold with respect to the display chassis 401 and the base chassis. In other embodiments, the hinged adjustable antenna may be any other metal antenna structures with a hinged portion to span the hinge 405 of a convertible information handling system. In one particular embodiment, the arm of the first adjustable antenna portion 420 and the arm of the second adjustable antenna portion 415 may be hinged to a sliding coaxial cable that enables the antenna arms to be fed by the antenna feed 410 yet also fold or hinge with the hinge mechanism 405. In a shown embodiment, the dipole antenna of the first adjustable antenna configuration 400*a* may support transmission and reception in a first radio frequency bandwidth. For example, the dipole antenna of the first adjustable antenna configuration 400*a* may support transmission and reception at 2.4 GHz in one particular embodiment.

When the display chassis 401 and the second chassis or base chassis 402 are rotated around hinge 405 into a tablet configuration, the second adjustable antenna configuration 400*b* may result in one embodiment. In the second adjustable antenna configuration 400*b*, the hinged adjustable antenna forms a loop antenna with an oscillator feed location 410 located at one side of the loop. In a particular embodiment, the two arms for the first adjustable antenna portion 420 and the second adjustable antenna portion 415 of the hinged adjustable antenna are folded around on top of one another in an embodiment to form a loop to be operatively coupled via an antenna feed with a radio oscillator. In such an embodiment, the ends of the previous dipole antenna arms of the first adjustable antenna portion 420 and the second adjustable antenna portion 415 meet and are operatively coupled or electrically coupled at their ends via reciprocal electrical contacts through the top cover or a-cover and the bottom cover or the d-cover. This second adjustable antenna configuration 400*b* forms a loop antenna type with different dimension and structure than the dipole antenna type of the first adjustable antenna configuration 400*a*. This loop antenna type of the second adjustable antenna configuration 400*b* has a full wavelength resonance in an embodiment that differs from 400*a* having a half-wavelength resonance and, therefore, may support a different radio frequency bandwidth. The loop antenna type of the second adjustable antenna configuration 400*b* may support transmission and reception in a second radio frequency bandwidth that may be approximately double the frequency at the second frequency bandwidth supported by the dipole antenna in an embodiment. FIG. 4 shows a hinged adjustable antenna for a convertible information handling system transitioning between a first adjustable antenna configuration 400*a* and a second adjustable antenna configuration 400*b* according to an embodiment of the present disclosure. The loop antenna type of the second adjustable antenna configuration 400*b* may support transmission and reception in a second radio frequency bandwidth when the convertible information handling system is in a tablet configuration. For example, the loop antenna of the second adjustable antenna configuration 400*b* may support transmission and reception at 5 GHz in one particular embodiment.

Figure 5:
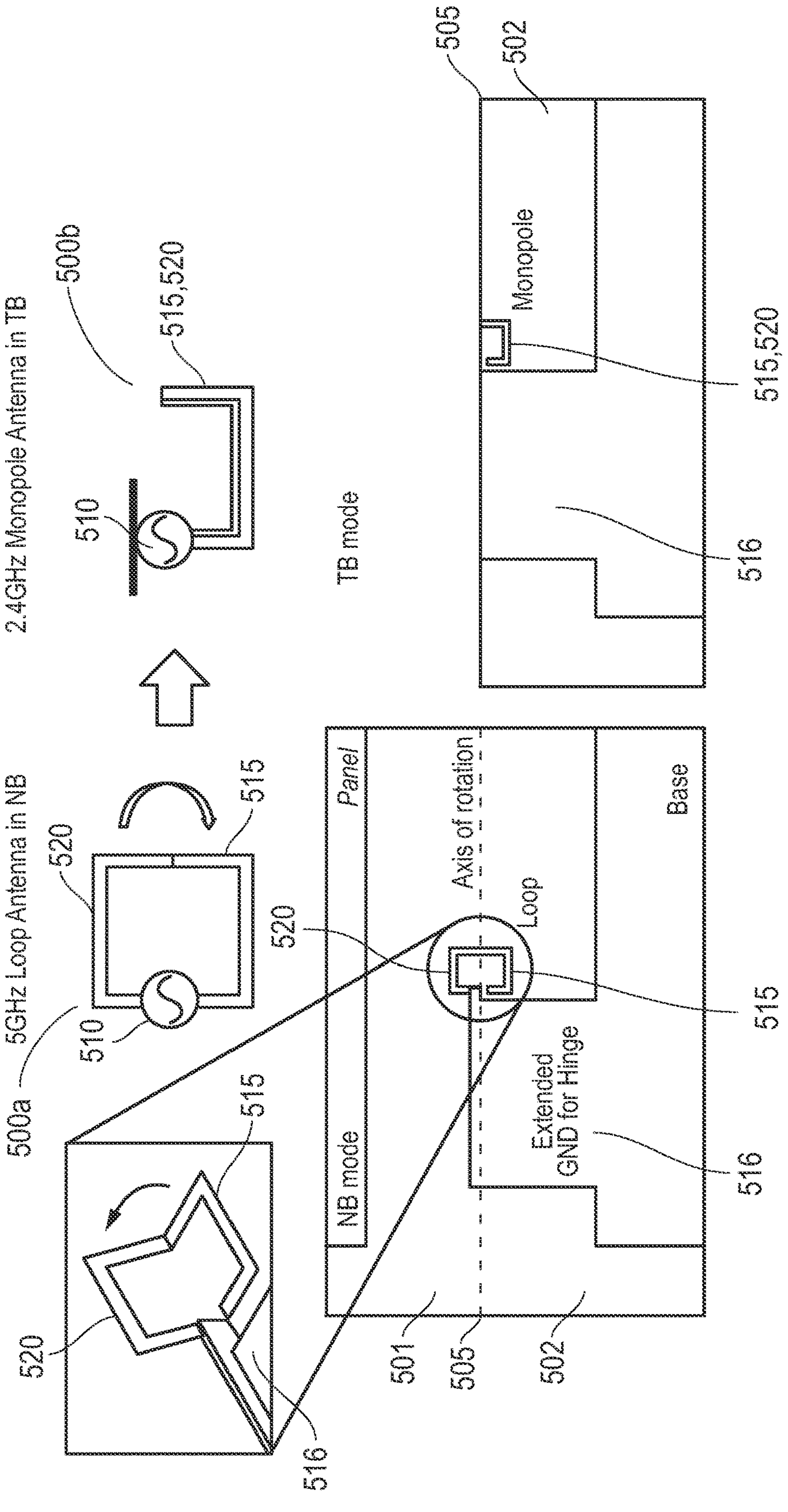
FIG. 5 is a closeup perspective top view of a hinged adjustable antenna for an information handling system and its transition between a first adjustable antenna configuration and a second adjustable antenna configuration about a hinge structure according to another embodiment of the present disclosure.

FIG. 5 shows a hinged adjustable antenna for a convertible information handling system transitioning between a first adjustable antenna configuration 500*a* and a second adjustable antenna configuration 500*b* according to another embodiment of the present disclosure. According to the embodiment of FIG. 5, a closeup view of the hinged adjustable antenna is shown with a first adjustable antenna portion 520 and a second adjustable antenna portion 515. The first adjustable antenna portion 520 is shown as part of a display chassis 501 and set behind a display panel 530 or with an antenna window in various embodiments. The second adjustable antenna portion 515 is shown as part of a second chassis or base chassis 502 of a convertible information handing system according to an embodiment. In one embodiment second chassis may be a base chassis 515 such as for housing a keyboard 560 and the second adjustable portion 515 may be set behind and antenna window, a radiofrequency transparent material of a c-cover, or a display panel in various embodiments. The hinged adjustable antenna is shown as spanning a hinge mechanism 505 in the embodiment of FIG. 5.

In a first user mode configuration, such as a laptop configuration, the hinged adjustable antenna forms a loop antenna with an oscillator feed location 510 located on two arms of the hinged adjustable antenna that form a loop antenna type for the convertible information handling system in an embodiment. Those arms may include a first adjustable antenna portion 520 that extends up with the display chassis 501 operatively coupled at its end with a second adjustable antenna portion 515 that extends into the base chassis 502 but in a different direction from the first adjustable antenna portion 520. The radio oscillator feed location 510 is operatively coupled to both arms including the first adjustable antenna portion 520 and the second adjustable antenna portion 515 and operates as a loop antenna. In an embodiment, the antenna arms of the hinged adjustable antenna may be formed as a metallic trace traces on a flexible printed circuit that may be folded over and flexible about hinge 505. In other embodiments, the hinged adjustable antenna may be comprised of any metal antenna structures or arms with one or more middle hinged portions spanning hinge 505. In particular, the arm of the first adjustable antenna portion 520 and the arm of the second adjustable antenna portion 515 may be hinged with a sliding coaxial cable that enables the antenna arms to be fed by the antenna feed 510 as a loop antenna but also fold or hinge with the hinge mechanism 505. In a shown embodiment, the loop antenna type of the first adjustable antenna configuration 500*a* may support transmission and reception in a first radio frequency bandwidth. For example, the loop antenna type of the first adjustable antenna configuration 500*a* may support transmission and reception at 5 GHz in one particular embodiment.

When the display chassis 501 and the second chassis or base chassis 502 are rotated around hinge 505 into a tablet configuration, the second adjustable antenna configuration 500*b* may result. In the second adjustable antenna configuration 500*b*, the hinged adjustable antenna forms a monopole antenna type with an oscillator feed location 510 located at one side of the monopole antenna type and feeding both arms, which are electrically coupled via one or more antenna contact points, as a single monopole antenna. In a particular embodiment, the two arms for the first adjustable antenna portion 520 and the second adjustable antenna portion 515 respectively of the hinged adjustable antenna are folded around on top of one another in an embodiment to form the monopole antenna type in the second adjustable antenna configuration. In particular, the two arms for the first adjustable antenna portion 520 and the second adjustable antenna portion 515 folded over one another and are operatively and electrically coupled via reciprocal coupling contacts along each arm and through a top cover or a-cover and a bottom cover or d-cover in an embodiment. In such an embodiment, the arms of the first adjustable antenna portion 520 and the second adjustable antenna portion 515 form a unified monopole antenna type.

This second adjustable antenna configuration 500*b* forms a monopole antenna type with different dimension and structure than the loop antenna type of the first adjustable antenna configuration 500*a*. This monopole antenna type of the second adjustable antenna configuration 500*b* is shorter in an embodiment that the loop antenna type of the first adjustable antenna portion 520. As a result, the monopole antenna type of the second adjustable antenna configuration 500*b* may support transmission and reception in a second radio frequency bandwidth in a tablet configuration that is different from the first radio frequency bandwidth supported by the first adjustable antenna configuration 500*a*. For example, the monopole antenna of the second adjustable antenna configuration 500*b* may support a radiofrequency bandwidth approximately half of the first adjustable antenna configuration 500*a*. For example, the monopole antenna of the second adjustable antenna configuration 500*b* may support transmission and reception at 2.4 GHz in one particular embodiment.

Figure 6:
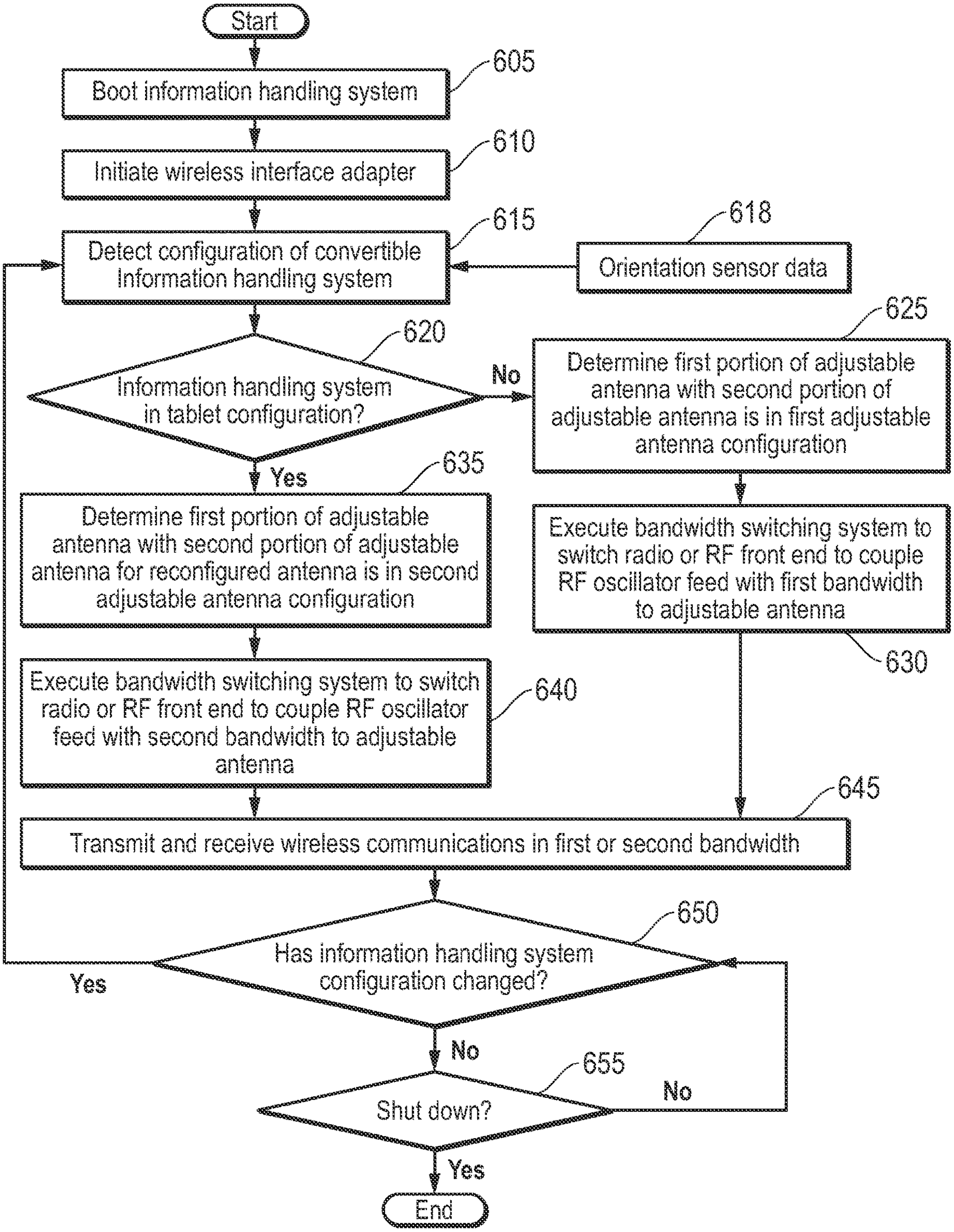
FIG. 6 is a flow diagram illustrating a method of operating an information handling system hinge mechanism with the hinged adjustable antenna changing antenna configuration according to an embodiment of the present disclosure.

FIG. 6 shows a method for operating a hinged adjustable antenna implementation with rotation of a hinge mechanism of a convertible information handling system according to an embodiment of the present disclosure. Depending on the configuration of the convertible information handling system, the hinged adjustable antenna reconfigures between a first adjustable antenna configuration forming a first antenna type and a second adjustable antenna configuration forming a second antenna type according to the embodiments herein. The first adjustable antenna configuration and the second adjustable antenna configurations support different wireless frequency bandwidths in an embodiment and the wireless interface adapter may switch between these frequency ranges based on the antenna configuration. In an embodiment, the different frequency bandwidths are those utilized by a WLAN wireless protocol such as the Wi-Fi protocol.

At block 605, the convertible information handling system may boot up in an embodiment. For example, a user may press a power button to power on the hardware system such as the CPU, memory, and other processors. Further, BIOS and OS software systems may initialize in the information handling system according to embodiments herein.

Proceeding to block 610, the system may initialize the wireless interface adapter to prepare for establishing wireless communications under one or more protocols as described with respect to FIG. 1 in an embodiment. The wireless adapter may include enabling wireless communications with one or more wireless links. In one example embodiment, the wireless protocol used by the wireless interface adapter may be a WLAN wireless protocol. In particular, the wireless protocol may include a Wi-Fi protocol such as Wi-Fi 6. Under such a protocol, the wireless interface adapter and radio may operate a radiofrequency oscillator at a 2.4 GHz band or a 5 GHz band in some embodiments. As described, the reconfiguration of the hinged adjustable antenna may support these two frequency bands in two different antenna configurations according to embodiments of the present disclosure.

At 615, the convertible information handling system may be in any number of configurations of a first chassis relative to a second chassis according to embodiments herein. For example, the convertible information handling system may detect via a configuration sensor hub operatively coupled to one or more configuration sensors in an embodiment, the configuration of the first chassis relative to the second chassis about a hinge mechanism. In some embodiments, the convertible information handling system may be a convertible laptop device having a display chassis and a base chassis. In some embodiments, the convertible information handling system may be a convertible double-display information handling system. Orientation sensor data 618 from one or more configuration sensors such as a gyroscope, accelerometer, hinge angle detector, infrared sensor, light sensor, Hall effect sensor, configuration reference sensor or other configuration sensor may be received at a configuration sensor hub and used to determine what configuration the convertible information handling system is in. This configuration detection may be utilized for a number of purposes, but may be provided to a wireless controller or other processing resource at the wireless interface device as well that may execute code instructions to determine the type of antenna configuration is operable for the hinged adjustable antenna in an embodiment.

At block 620, the wireless controller or other processing resource at the wireless interface device may receive an indication of the configuration of the first chassis relative to the second chassis. Upon receiving an indication of the convertible information handling system configuration, the wireless controller or other processing resource at the wireless interface device may determine whether the convertible information handling system is in tablet configuration. If the convertible information handling system is not in tablet configuration, then flow may proceed to block 625. If the convertible information handling system is in tablet configuration, then flow may proceed to block 635.

At block 625, when it is determined that the convertible information handling system is not in tablet configuration, the system will determine that a first portion of the hinged adjustable antenna relative to the second portion of the hinged adjustable antenna is in a first hinged adjustable antenna configuration. In one embodiment, when the hinged adjustable antenna is in a first hinged adjustable antenna configuration, this may support a first wireless frequency band selected from two or more available wireless frequency bands to be utilized by the wireless adapter with the hinged adjustable antenna. The first wireless frequency band may be supported due to the antenna configuration formed by the first portion of the hinged adjustable antenna relatively separated from the second portion of the hinged adjustable antenna and the dimension and type of antenna that results. In a particular embodiment, when the convertible information handling system is not detected in tablet configuration, the system may determine if the convertible information handling system is in another configuration that supports the first hinged adjustable antenna configuration. For example, the configuration sensor hub may be used to determine that the convertible information handling system is in a laptop configuration mode such that the first portion of the hinged adjustable antenna relative to the second portion of the hinged adjustable antenna results in an antenna type for a first hinged adjustable antenna configuration.

In one example embodiment, when the non-tablet mode is detected, or in a more particular example a laptop mode is detected as the convertible information handling system configuration, then the hinged adjustable antenna may have the first portion of the hinged adjustable antenna relative to the second portion of the hinged adjustable antenna as a dipole antenna spanning the hinge mechanism. This dipole antenna is the antenna type for a first hinged adjustable antenna configuration in an embodiment. In a more particular embodiment, the dipole antenna may support a 2.4 GHz frequency band, such as for a WLAN protocol such as Wi-Fi, Wi-Fi 6, or Wi-Fi 6e. Such an embodiment is further depicted in FIG. 4.

In another example embodiment, when the non-tablet mode is detected, or in a more particular example a laptop mode is detected as the convertible information handling system configuration, then the hinged adjustable antenna may have the first portion of the hinged adjustable antenna relative to the second portion of the hinged adjustable antenna as a loop antenna spanning the hinge mechanism. This loop antenna is the antenna type for a first hinged adjustable antenna configuration in such an embodiment. In a more particular embodiment, the loop antenna may support a 5 GHz frequency band, such as for a WLAN protocol such as Wi-Fi, Wi-Fi 6, or Wi-Fi 6e. Such an embodiment is further depicted in FIG. 5.

At block 630, determination that the resulting antenna type for a first hinged adjustable antenna configuration from the non-tablet mode or, more specifically, from a laptop mode configuration will cause the wireless interface adapter to utilize a first frequency band for wireless communications via the hinged adjustable antenna in an embodiment. Determination of the non-table mode or affirmative determination of a laptop mode will result in switching the wireless interface adapter with a bandwidth switching system to a first radio frequency band that is supported by the structure of antenna type for a first hinged adjustable antenna configuration. In one example embodiment, the first radio frequency bandwidth may be a 2.4 GHz bandwidth for use with a WLAN protocol. In another example embodiment, the first radio frequency bandwidth may be a 5 GHz bandwidth for use with a WLAN protocol.

The bandwidth switching system may operate with the wireless controller to adjust the radiofrequency oscillator used in a radio of a wireless interface device to select the first radio frequency bandwidth to be used in one embodiment. In another embodiment, the bandwidth switching system may operate switch at the front-end circuitry to operatively couple the hinged adjustable antenna to another radiofrequency oscillator operating at the first radio frequency bandwidth used with the radio and wireless controller of a wireless interface device to change the frequency used to transmit and receive wirelessly via the hinged adjustable antenna in another embodiment. It is contemplated that any frequency bandwidth switching technique may be used to switch or select the first frequency bandwidth used at the wireless interface device among plural available radio frequency bandwidths to be used by the wireless protocol for wireless communications.

Proceeding block 645, the wireless interface adapter may utilize the antenna type for a first hinged adjustable antenna configuration to establish a wireless link with a WLAN network access point under the first radio frequency bandwidth in an embodiment. Then the wireless interface adapter may conduct wireless communications for the convertible information handling system using the first radio frequency bandwidth under the WLAN protocol. Flow may then proceed to block 650 to monitor for changes in configuration modes of the convertible information handling system.

Returning to block 620, if the convertible information handling system is in tablet configuration, then flow may proceed to block 635. At block 635, when it is determined that the convertible information handling system is in tablet configuration mode, the system will determine that a first portion of the hinged adjustable antenna relative to the second portion of the hinged adjustable antenna may overlap such that it is in a second hinged adjustable antenna configuration. In an embodiment, the second hinged adjustable antenna configuration may have overlap and electrical contact between the first portion of the hinged adjustable antenna and the second portion of the hinged adjustable antenna folded over the hinge mechanism. In one embodiment, when the hinged adjustable antenna is in the second hinged adjustable antenna configuration, this may support a second wireless frequency band selected from two or more available wireless frequency bands to be utilized by the wireless adapter with the hinged adjustable antenna. The second wireless frequency band may be supported due to the antenna configuration formed by overlapping or connecting the first portion of the hinged adjustable antenna relative to the second portion of the hinged adjustable antenna such that the dimension and type of antenna formed as a result supports a second wireless frequency band.

In one example embodiment, when the tablet configuration mode is detected as the convertible information handling system configuration, then the hinged adjustable antenna may have the first portion of the hinged adjustable antenna relative to the second portion of the hinged adjustable antenna as a loop antenna spanning the folded hinge mechanism. The loop antenna may result from what was a dipole antenna in a first hinged adjustable antenna configuration folded over on itself such that the two portions are electrically coupled at the ends via a contact point through the first chassis and second chassis to form a loop antenna as the second hinged adjustable antenna configuration. This loop antenna is the antenna type for the second hinged adjustable antenna configuration in an embodiment. In a more particular embodiment, the loop antenna may support a 5 GHz frequency band, such as for a WLAN protocol such as Wi-Fi, Wi-Fi 6, or Wi-Fi 6e. Such an embodiment is further depicted in FIG. 4.

In another example embodiment, when the tablet configuration mode is detected as the convertible information handling system configuration, then the hinged adjustable antenna may have the first portion of the hinged adjustable antenna relative to the second portion of the hinged adjustable antenna folded over on itself to form a monopole antenna spanning the folded hinge mechanism. The monopole antenna may result from what was a loop antenna in a first hinged adjustable antenna configuration folded over on itself such that the two portions are electrically coupled along the first and second portion via one or more contact points through the first chassis and second chassis to form a monopole. This monopole antenna is the antenna type for a second hinged adjustable antenna configuration in such an embodiment. In a more particular embodiment, the monopole antenna may support a 2.4 GHz frequency band, such as for a WLAN protocol such as Wi-Fi, Wi-Fi 6, or Wi-Fi 6e. Such an embodiment is further depicted in FIG. 5.

At block 640, determination that the resulting antenna type for a second hinged adjustable antenna configuration from the tablet mode will cause the wireless interface adapter to utilize a second frequency band for wireless communications via the hinged adjustable antenna in an embodiment. In other words, determination of the tablet mode will result in switching the wireless interface adapter with a bandwidth switching system to a second radio frequency band that is supported by the structure of antenna type for a second hinged adjustable antenna configuration. In one example embodiment, the second radio frequency bandwidth may be a 5 GHz bandwidth for use with a WLAN protocol. In another example embodiment, the second radio frequency bandwidth may be a 2.4 GHz bandwidth for use with a WLAN protocol.

The bandwidth switching system may operate with the wireless controller to adjust the radiofrequency oscillator used in a radio of a wireless interface device to select the second radio frequency bandwidth to be used at block 640 in an embodiment. In another embodiment, the bandwidth switching system may operate switch at the front-end circuitry to operatively couple the hinged adjustable antenna to another radiofrequency oscillator operating at the second radio frequency bandwidth used at block 640 with the radio and wireless controller of a wireless interface device to change the frequency used to transmit and receive wirelessly via the hinged adjustable antenna in another embodiment. It is contemplated that any frequency bandwidth switching technique may be used to switch or select the second frequency bandwidth used at the wireless interface device among plural available radio frequency bandwidths to be used by the wireless protocol for wireless communications.

Proceeding again to block 645, the wireless interface adapter may utilize the antenna type for a second hinged adjustable antenna configuration when in tablet configuration mode to establish a wireless link with a WLAN network access point under the second radio frequency bandwidth in an embodiment. Then the wireless interface adapter may conduct wireless communications for the convertible information handling system using the second radio frequency bandwidth under the WLAN protocol. Flow may then proceed to block 650 to monitor for changes in configuration modes of the convertible information handling system.

At block 650, the wireless controller or other processing resource at the wireless interface adapter will monitor for a change in configuration of the convertible information handling system in an embodiment. If it is determined at block 650 that the configuration for the convertible information handling system has been changed, then flow may return to block 615 to determine the current configuration mode from the configuration sensor hub and from configuration sensor data 618 received from one or more configuration sensors. The method may then proceed as described herein. If no change in configuration of the convertible information handling system is detected at block 650, flow may proceed to block 655. At block 655, the system may determine if the wireless interface adapter or the convertible information handling system has been shut down in various embodiments. If shut down, then the method may end. If not shut down, then flow may return to block 650 to continue to monitor for changes in the configuration mode of the convertible information handling system.

It is understood that the methods and concepts described in the algorithm above for FIG. 6 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A convertible information handling system comprising:

an antenna feed operatively coupled to a wireless adapter and a hinged adjustable antenna for communicating on a wireless link;

a hinge pivoting between a first antenna portion of the hinged adjustable antenna on a display chassis and a second antenna portion of a hinged adjustable antenna on a base chassis, where the hinged adjustable antenna spans the hinge;

the hinge operable to rotate the convertible information handling system between a first configuration of the display chassis relative to the base chassis and a tablet configuration of the display chassis relative to the base chassis; and the hinged adjustable antenna having a first adjustable antenna configuration in the first configuration of the display chassis relative to the base chassis and a second adjustable antenna configuration in the tablet configuration of the display chassis relative to the base chassis, where the first adjustable antenna configuration supports a first bandwidth at the wireless adapter and the second adjustable antenna configuration supports a second bandwidth at the wireless adapter.

2. The convertible information handling system of claim 1, wherein first configuration of the display chassis relative to the base chassis is a laptop configuration.

3. The convertible information handling system of claim 1 further comprising:

a configuration sensor hub operatively coupled to a configuration sensor to detect the configuration of the convertible information handling system between the first configuration of the display chassis relative to the base chassis and the tablet configuration of the display chassis relative to the base chassis.

4. The convertible information handling system of claim 1 further comprising:

the wireless adapter transmitting wirelessly via the first adjustable antenna configuration of the hinged adjustable antenna in the first bandwidth when the convertible information handling system is in the first configuration of the display chassis relative to the base chassis; and the wireless adapter transmitting wirelessly via the second adjustable antenna configuration of the hinged adjustable antenna in the second bandwidth when the convertible information handling system is in the tablet configuration of the display chassis relative to the base chassis.

5. The convertible information handling system of claim 1, wherein first adjustable antenna configuration of the hinged adjustable antenna forms a dipole antenna and the second adjustable antenna configuration forms a loop antenna.

6. The convertible information handling system of claim 1, wherein first bandwidth supported at the wireless adapter is 2.4 GHz for a wireless local area network (WLAN) wireless protocol and the second bandwidth is 5 GHz.

7. The convertible information handling system of claim 1, wherein first adjustable antenna configuration of the hinged adjustable antenna forms a loop antenna and the second adjustable antenna configuration forms a monopole antenna.

8. The convertible information handling system of claim 1, wherein first bandwidth supported at the wireless adapter is 5 GHz for a wireless local area network (WLAN) wireless protocol and the second bandwidth is 2.4 GHz.

9. The convertible information handling system of claim 1 further comprising:

the wireless adapter including a bandwidth switching system to switch between the first bandwidth and the second bandwidth upon detecting a configuration change between the first configuration of the display chassis relative to the base chassis and the tablet configuration.

10. A method comprising:

rotating a display chassis with respect to a second chassis around a hinge of a convertible information handling system between a first configuration of the display chassis relative to the second chassis and a tablet configuration of the display chassis relative to the second chassis;

pivoting around the hinge a first antenna portion of an hinged adjustable antenna on the display chassis relative to a second antenna portion of the hinged adjustable antenna on the second chassis, where the hinged adjustable antenna spans the hinge and reconfigures between a first adjustable antenna configuration and a second adjustable antenna configuration based on convertible information handling system being in the first configuration of the display chassis relative to the second chassis or the tablet configuration of the display chassis relative to the second chassis respectively; and switching an antenna feed operatively coupled to a wireless adapter and the hinged adjustable antenna with a bandwidth switching system to switch between a first bandwidth for the first adjustable antenna configuration and a second bandwidth for the second adjustable antenna configuration for communicating wirelessly with the wireless adapter.

11. The method of claim 10 further comprising:

transmitting wirelessly with the wireless adapter via the first adjustable antenna configuration of the hinged adjustable antenna in the first bandwidth when the convertible information handling system is in the first configuration of the display chassis relative to the second chassis; and transmitting wirelessly via the second adjustable antenna configuration of the hinged adjustable antenna in the second bandwidth when the convertible information handling system is in the tablet configuration of the display chassis relative to the second chassis.

12. The method of claim 10, wherein first adjustable antenna configuration of the hinged adjustable antenna forms a dipole antenna and the second adjustable antenna configuration forms a loop antenna.

13. The method of claim 10, wherein first adjustable antenna configuration of the hinged adjustable antenna forms a loop antenna and the second adjustable antenna configuration forms a monopole antenna.

14. The method of claim 10, wherein first bandwidth supported by the first adjustable antenna configuration and the second bandwidth supported by the second adjustable antenna configuration are wireless bandwidths used by the wireless adapter to communicate under a Wi-Fi wireless protocol.

15. The method of claim 10, wherein the second chassis is a second display chassis of the convertible information handling system.

16. A convertible information handling system comprising:

an antenna feed operatively coupled to a wireless adapter and a hinged adjustable antenna for communicating on a wireless link;

a hinge pivoting between a first antenna portion of the hinged adjustable antenna on a display chassis and a second antenna portion of a hinged adjustable antenna on a second chassis, where the hinged adjustable antenna spans the hinge;

the hinge operable to rotate the convertible information handling system between a first configuration of the display chassis relative to the second chassis and a tablet configuration of the display chassis relative to the second chassis;

the wireless adapter including a bandwidth switching system to switch between a first bandwidth and a second bandwidth upon detecting a configuration change between the first configuration of the display chassis relative to the second chassis and the tablet configuration of the display chassis relative to the second chassis; and the hinged adjustable antenna having a first adjustable antenna configuration in the first configuration of the display chassis relative to the second chassis and a second adjustable antenna configuration in the tablet configuration of the display chassis relative to the second chassis, where the first adjustable antenna configuration supports a first bandwidth at the wireless adapter and the second adjustable antenna configuration supports a second bandwidth at the wireless adapter.

17. The convertible information handling system of claim 16, wherein first configuration of the display chassis relative to the second chassis is a laptop configuration.

18. The convertible information handling system of claim 16 further comprising:

a configuration sensor hub operatively coupled to a configuration sensor to detect the configuration of the convertible information handling system between the first configuration of the display chassis relative to the second chassis and the tablet configuration of the display chassis relative to the second chassis.

19. The convertible information handling system of claim 16, wherein first adjustable antenna configuration of the hinged adjustable antenna forms a dipole antenna and the second adjustable antenna configuration forms a loop antenna.

20. The convertible information handling system of claim 16, wherein first adjustable antenna configuration of the hinged adjustable antenna forms a loop antenna and the second adjustable antenna configuration forms a monopole antenna.

* * * * *